United States Patent [19]

Nagashima

[11] Patent Number: 4,721,193
[45] Date of Patent: Jan. 26, 1988

[54] EMERGENCY BRAKING SYSTEM OF CHAIN SAW

[75] Inventor: Akira Nagashima, Kawasaki, Japan
[73] Assignee: Kioritz Corporation, Tokyo, Japan
[21] Appl. No.: 780,437
[22] Filed: Sep. 26, 1985

[30] Foreign Application Priority Data

Oct. 18, 1984 [JP] Japan .................. 59-157566[U]

[51] Int. Cl.⁴ .............................................. F16D 67/02
[52] U.S. Cl. .................................. 192/17 R; 30/381;
188/77 R
[58] Field of Search ............... 192/17 R, 14, 16, 102;
56/11.3; 30/381, 382; 188/77 R, 77 W, 166

[56] References Cited

U.S. PATENT DOCUMENTS

| | | | |
|---|---|---|---|
| 3,776,331 | 12/1973 | Gustafsson | 30/381 X |
| 4,140,209 | 2/1979 | Müller | 192/17 R |
| 4,156,477 | 5/1979 | Nagashima et al. | 30/381 X |
| 4,282,958 | 8/1981 | Zindler | 192/17 R |
| 4,324,045 | 4/1982 | Höppner et al. | 30/381 |
| 4,367,813 | 1/1983 | Wieland et al. | 192/17 R |
| 4,420,885 | 12/1983 | Todero | 30/381 |
| 4,493,400 | 1/1985 | Nagashima et al. | 30/381 |
| 4,553,326 | 11/1985 | West | 30/381 |
| 4,560,040 | 12/1985 | Mörner et al. | 188/77 R |
| 4,586,588 | 5/1986 | Nagashima et al. | 30/381 X |

Primary Examiner—Rodney H. Bonck
Assistant Examiner—Richard M. Lorence
Attorney, Agent, or Firm—Browdy and Neimark

[57] ABSTRACT

An emergency braking system of a chain saw including a hand guard located in front of a front handle bar, and an inertia trigger. The hand guard is pivotally supported by a body of the chain saw and urged by the biasing force of a spring to move downwardly so that its lower end is located in spaced juxtaposed relation to a lever of an actuation device. The inertia trigger is pivotally supported at one end thereof by the hand guard and biased so as to thereby prevent the hand guard from moving downwardly.

9 Claims, 1 Drawing Figure

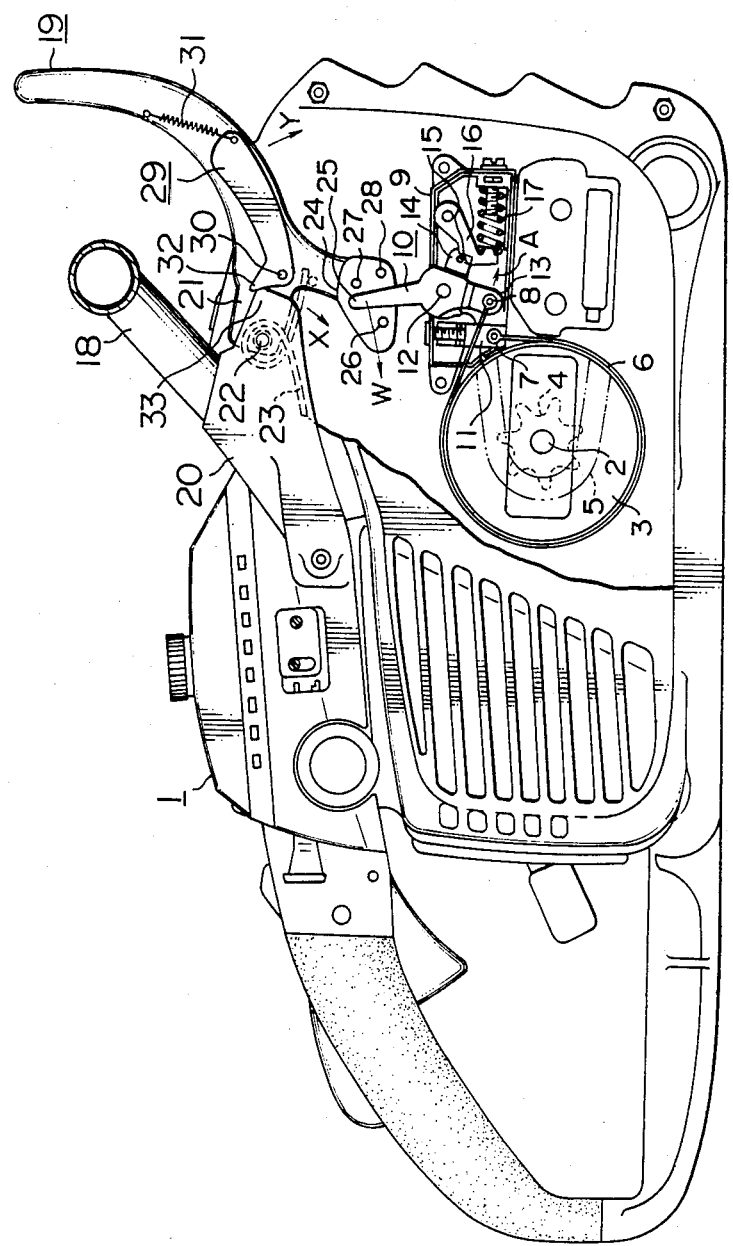

EMERGENCY BRAKING SYSTEM OF CHAIN SAW

BACKGROUND OF THE INVENTION

(1) Field of the Invention

This invention relates to emergency braking systems of chain says, and more particularly it is concerned with an emergency braking system of a chain saw adapted to apply, in case of emergency, the brake to a clutch drum rotated by the rotary shaft of an engine through a centrifugal clutch by means of a braking band wound on the clutch drum through a lever of an actuation device.

(2) Description of the Prior Art

One type of emergency braking system of chain saws of the prior art has been equipped with a sensing lever located in a position in which the sensing lever is struck with great force by the hand or wrist of an operator when, during a sawing operation, the forward end of the chain saw is moved upwardly by a kickback phenomenon or the hand of the operator slips on the handle bar. The force exerted by the hand or wrist of the operator on the sensing lever pivotally moves the latter, to thereby render the actuation device operative to cause the braking band to apply the emergency brake to the clutch drum. In another type of emergency braking system of chain saws of the prior art, the front handle bar has been provided with a protector which functions as an inertia member that keenly senses the kickback phenomenon and renders the actuation device operative to apply the emergency brake to the clutch drum.

The emergency braking systems of chain saws of the prior art constructed as described hereinabove have suffered the disadvantage that, in spite of the fact that the opeator expecting kickbacks of low intensity occuring often during a sawing operation firmly grips the handle bar to cope with any slight kickback that might occur, the emergency braking systems tend to be automatically rendered operative, with the result that the guide bar of the chain saw is stuck in a tree trunk or the tree being sawed is split. To obviate this problem, it has been the tendency of the operator to set the emergency braking system at a reduced sensitivity level when the chain saw is operated.

SUMMARY OF THE INVENTION

This invention has been developed for the purpose of obviating the aforesaid problem of the prior art. Accordingly, the invention has as its object the provision of an emergency braking system of a chain saw which positively operates in case of emergency although it is prevented from being rendered operative when kickbacks of low magnitude occur.

According to the invention, there is provided an emergency braking system of a chain saw adapted to apply, in case of emergency, the brake to a clutch drum by means of a braking band wound thereon through a lever of an acutation device, said clutch drum being rotated by a rotary shaft of an engine through a centrifugal clutch, comprising, in combination, a hand guard located in front of a front handle bar, said hand guard being pivotally supported by a body of the chain saw and urged by the biasing force of a spring to move downwardly so that its lower end is located in spaced juxtaposed relation to the lever of the actuation device, and an inertia trigger pivotally supported at one end thereof by the and guard and biased so as to keep the hand guard functioning as an inertia member from moving downwardly.

In the emergency braking system of the chain saw of the aforesaid construction, the lever of the actuation device for actuating the braking band is rendered operative by the hand guard located in front of the front handle bar and the hand guard is locked in position by the inertia trigger which is an inertia member while the range of operations of the system with respect to the impact of shocks is decided by the biasing force of an inertia trigger spring. When a shock of an impact in the range of operations of the system is applied by a kickback to the chain saw, the inertia trigger is moved downwardly by the force of inertia against the biasing force of the inertia trigger spring, with the result that the inertia trigger is unlocked and allows the hand guard to be pivotally moved downwardly by the biasing force of the hand guard spring. Thus, the hand guard moves by its lower end the lever of the actuation device to cause the braking band to clamp the clutch drum, to thereby apply the emergency brake.

In the emergency braking system of the chain saw according to the invention, the hand guard and inertia trigger are provided as separate entities which operate in combination with each other. The inertia trigger itself is compact in size, and the range of operations of the system with respect to the impact of shocks of kickbacks can be varied readily and positively by adjusting the biasing force of the inertia trigger spring and the weight of the inertia trigger. The hand guard is not directly connected to the lever of the actuation device to avoid vibrations of the hand guard caused by the vibration of the body of the chain saw being transmitted to the lever at all times. By this arrangement, the emergency braking system is prevented from being rendered operative against the operator's will.

BRIEF DESCRIPTION OF THE DRAWING

The single drawing is a sectional view of the essential portions of a chain saw equipped with one embodiment of the emergency braking system of the chain saw according to the invention.

DESCRIPTION OF THE PREFERRED EMBODIMENT

A preferred embodiment of the invention will now be described in detail by referring to the accompanying drawing.

A chain saw generally designated by the reference numeral 1 has attached to one side of its front portion a saw chain guide plate, not shown, and a rotary shaft 2 of an engine of the chain saw extends outwardly from its rear portion and supports centrifugal clutch means comprising a clutch drum 3. A chain sprocket wheel 4 is mounted to the clutch drum 3 to form a unit therewith, so that when the chain sprocket wheel 4 is driven a saw chain 5 moves in sliding movement along the periphery of the saw chain guide plate. Wound around an outer periphery of the clutch drum 3 is a braking band 6 connected at one end 7 thereof to an adjusting member 11 connected to a part of the body of the chain saw and at an opposite end 8 to a lower leg 13 of a lever 10.

The lever 10 which is pivotally supported by a shaft 12 located adjacent the adjusting member 11 has a lateral leg 14 cooperating with the lower leg 13 to form a fork, the lateral leg 14 being formed with a projection 15 against which a recess formed in a lock member 16 is forced by the biasing force of a compression spring 17 mounted to the lock member 16, to thereby lock the lever 10 in neutral position. A hand guard 19 located above the lever 10 and in front of a front handle bar 18 is pivotally supported at an upper portion 21 through a shaft 22 by a base 20 of the front handle bar 18 and urged by the biasing force of a hand guard spring (which is a torsion spring in this embodiment) 23 to move downwardly (clockwise is shown). A lower end portion 24 of the hand guard 19 cooperating with the upper portion 21 to form a fork is formed with projections 26, 27 and 28 located in spaced juxtaposed relation to an upper portion 25 of the lever 10. An inertia trigger 29 is pivotally supported at its base by an upper portion of the lower end portion 24 of the hand guard 19 through a shaft 30, and an inertia trigger spring (which is a tension spring in this embodiment) 31 is connected at one end to an end of the inertia trigger 29 opposite its base and at an opposite end to the hand guard 19 to urge the inertia trigger 29 to move counterclockwise. A catch portion 32 formed at the base of the inertia trigger 29 is brought into catching engagement with a corner portion 33 formed at the base 20 of the front handle bar 18, to prevent the hand guard 19 from being moved clockwise by the biasing force of the hand guard spring 23. Namely, the catch portion 32 maintained in catching engagement with the corner portion 33 of the base 20 of the front handle bar 18 should be brought out of engagement therewith to allow the hand guard 19 to be moved clockwise by the biasing force of the hand guard spring 23. To bring the catch portion 32 out of engagement with the corner portion 33 requires clockwise pivotal movement of the inertia trigger 29 against the biasing force of the tension spring 31.

When an impact of high intensity oriented vertically upwardly is applied by a shock, such as a kickback, to the body of the chain saw during a sawing operation, the front portion of the chain saw is flipped upwardly with great force, and the inertia trigger 29 is pivotally moved clockwise by its own inertia relative to the body of the chain saw, with the result that the catch portion 32 of the inertia trigger 29 is released from catching engagement with the corner portion 33 of the base 20 of the front handle bar 18. This allows the hand guard 19 to be rapidly moved clockwise about the shaft 22 by the biasing force of the hand guard spring 23. Pivotal movement of the hand guard 19 causes its lower end portion 24 to move also clockwise, so that the upper portion 25 of the lever 10 is pushed by the projections 27 and 28 and moves pivotally counterclockwise about the shaft 12. This causes the lower portion 13 of the lever 10 to pull the opposite end 8 of the braking band 6, to apply the brake to the clutch drum 3, while the projection 15 of the lateral portion 14 of the lever 10 is released from engagement with the recess of the lock member 16, to thereby unlock the lever 10. This allows both the compression spring 17 and hand guard spring 23 to function to pull the braking band 6 in the brake applying direction, thereby ensuring that the braking force of high intensity is put into action in applying the brake to the clutch drum 3.

In the event that the hand of the operator gripping the front handle bar 18 inadvertently slips and strikes the hand guard 19 during a sawing operation, the hand guard 19 is pivotally moved clockwise in the same manner as if an impact were applied by a kickback to the chain saw so long as the force exerted on the hand guard 19 overcomes the biasing force of the tension spring 31, so that the brake is applied to the clutch drum 3 in the same manner as described by referring to the application of an impact to the chain saw by a kickback.

The emergency braking system of the aforesaid construction and operation can be restored to its original neutral position as follows. By pivotally moving the hand guard 19 manually counterclockwise, it is possible to cause the projection 26 of the lower end portion 24 of the hand guard 19 to push the upper portion 25 of the lever 10 to pivotally move same clockwise and to cause the projection 15 of the lateral portion 14 of the lever 10 to move the lock member 16 counterclockwise, to thereby compress the compression spring 17. Thus, the projection 15 of the lateral portion 14 of the lever 10 is brought into locking engagement with the recess of the lock member 16, to thereby keep the braking band 6 in a position in which no brake is applied. Thus, the catch portion 32 of the inertia trigger 29 is brought into catching engagement with the corner portion 33 of the base 20 of the front handle bar 18, to thereby lock the hand guard 19 in normal operating position.

What is claimed is:

1. An emergency braking system of a chain saw adapted to apply, in case emergency, a braking force to a clutch drum by means of a braking band wound thereon connected with a lever of an actuation device on a body of the chain saw, said clutch drum being rotated by a rotary shaft of an engine through a centrifugal clutch, comprising
   a hand guard located in front of a front handle bar of said chain saw , said hand guard being pivotally supported by the body of the chain saw and urged by a biasing force of a spring to move pivotally while its lower end is located in spaced juxtaposed relation to the lever of the actuation device, and
   an inertia trigger functioning as an inertia member pivotally supported at one end thereof by the hand guard, said inertia trigger effectively biasing the hand guard from moving pivotally in said forward direction,
   wherein a sufficient kicking upward of said saw blade or a sufficient pressing forward of said hand guard by an operator using the chain saw triggers said inertia trigger, thus providing a braking force to said braking drum, said inertia trigger rotating in the same one direction as said hand guard for both types of triggering for applying said braking force to said braking drum.

2. An emergency braking system of a chain saw as claimed in claim 1, wherein said inertia trigger is formed with a catch engaging portion for providing a catching engagement with a portion of the body of the chain saw until said inertia trigger is triggered.

3. An emergency braking system of a chain saw as claimed in claim 2, wherein said hand guard comprises an upper portion pivotally supported at a portion of the body of the chain saw, and a lower end portion located in spaced juxtaposed relation to the lever of the actuation device, said upper portion and lower end portion cooperating with each other to form a fork.

4. In a chain saw having a front handle bar, an emergency braking system for selectively applying a braking force to a clutch drum rotatably driven by a chain saw motor, said chain saw comprising:
   a brake lever pivotally supported by first pivot means on said chain saw for rotational movement about said first pivot means, said brake lever including a first leg and a second, oppositely directed leg, a brake band wound about said clutch drum, said brake band being secured at one end to said chain saw and being secured at its opposite end ot said brake lever first leg, a pivotable hand hard including a first portion disposed in front of said handle bar, and second portion attached by second pivot means to said chain saw, and a third portion located between, and extending downwardly from, said first and second portions, said third portion carrying projecting means for engaging said brake lever second leg, so that pivoting of the hand guard in a first rotational direction will cause said brake lever to pivot in a second rotational direction opposite said first rotational direction, first biasing means, engaged with said hand guard, for urging said hand guard in said first rotational direction, second biasing means, releasably engaged with said brake lever for inhibiting pivoting of said brake lever in either of said first or second rotational directions until said brake lever second leg is engaged by said hand guard projection means, and inertia-responsive means for releasably blocking pivoting movement of said hand guard and for triggering pivoting movement of said hand guard in said first rotational direction, whereby when said chain saw sustains an impact of a predetermined amount, said inertia-responsive means for said triggering is released from a position blocking pivoting of said hand guard so that said brake lever pivots in said second rotational direction and causes said brake band to apply a braking force to said clutch drum.

5. The braking system of claim 4, wherein said brake band one end is connected to means for adjusting the tension on said brake band.

6. The braking system of claim 4, wherein said inertia-responsive means comprises a lever pivotally attached to said hand guard and including, at one end of said lever, means for releasably engaging a portion of said chain saw adjacent said second pivot means.

7. The braking system of claim 6, wherein said inertia-responsive means further comprises third biasing means for normally urging said one end of said inertia-responsive means into engagement with said chain saw portion adjacent said second pivot means, said third biasing means being secured between said first portion of said hand guard and a second end of said lever.

8. The braking system of claim 4, wherein said second biasing means includes a spring-urged pivoted plate including a locking recess, and said brake lever further includes a third leg extending forwardly of said first and second legs, said third leg supporting means for engaging said locking recess, whereby until said triggering means is released from said position blocking pivoting of said hand guard, said brake lever is prevented from pivoting in either of said first or second rotational directions.

9. The braking system of claim 8, wherein said second biasing means acts together with said first biasing means to cause said brake band to engage said clutch durm, after said inertia-responsive means is triggered.

* * * * *